(12) United States Patent
Hilligoss

(10) Patent No.: US 6,855,283 B2
(45) Date of Patent: Feb. 15, 2005

(54) METHOD FOR FORMING A SHEET, FIBER AND RESIN COMPOSITE

(75) Inventor: Lloyd R. Hilligoss, South Lyon, MI (US)

(73) Assignee: Patent Holdings Company, Fraser, MI (US)

( * ) Notice: Subject to any disclaimer, the term of this patent is extended or adjusted under 35 U.S.C. 154(b) by 92 days.

(21) Appl. No.: 10/205,234

(22) Filed: Jul. 25, 2002

(65) Prior Publication Data

US 2004/0018350 A1 Jan. 29, 2004

(51) Int. Cl.$^7$ .............................................. B29C 41/22
(52) U.S. Cl. ....................... 264/255; 264/266; 264/267; 264/271.1; 264/309
(58) Field of Search ................................ 264/266, 267, 264/328.1, 221.1, 229.1, 309, 255; 425/546

(56) References Cited

U.S. PATENT DOCUMENTS

| | | | | |
|---|---|---|---|---|
| 3,725,354 A | * | 4/1973 | Sundholm | 528/63 |
| 5,401,457 A | * | 3/1995 | Valyi | 264/511 |
| 5,783,287 A | * | 7/1998 | Yamamoto et al. | 428/192 |
| 6,132,669 A | * | 10/2000 | Valyi et al. | 264/510 |
| 6,294,121 B1 | * | 9/2001 | Hara et al. | 264/328.7 |
| 2002/0150748 A1 | * | 10/2002 | Delusky et al. | 428/297.4 |

FOREIGN PATENT DOCUMENTS

| | | | |
|---|---|---|---|
| JP | 59-026231 | * | 2/1984 |
| JP | 04-201421 | * | 7/1992 |

OTHER PUBLICATIONS

Derwent Abstract 1993-134237: "Moulding a Fiber Reinforced Thermoplastic Material with a Decorative Layer.".*

* cited by examiner

Primary Examiner—Stefan Staicovici
(74) Attorney, Agent, or Firm—Welsh & Katz, Ltd.

(57) ABSTRACT

A cured resin and fiber part generally can be manufactured by providing a mold that defines a cavity having at least one shape-defining surface. An in-mold paint sheet having a bonding side and a finish side can be positioned in the cavity of the mold such that the finish side of the in-mold paint sheet is positioned adjacent to the shape-defining surface of the mold. A mixture of a thermoset resin and a plurality of reinforcing fibers are then introduced into the cavity of the mold such that the resin and fiber mixture contacts the bonding side of the in-mold paint sheet. The in-mold paint sheet and resin and fiber mixture are then compressed in the mold while being heated causing the resin and fiber mixture to be cured and bonded to the in-mold paint sheet resulting in a part having the finish side of the in-mold paint sheet as a finished surface of the part.

13 Claims, 6 Drawing Sheets

METHOD FOR FORMING A SHEET, FIBER AND RESIN COMPOSITE

BACKGROUND OF THE INVENTION

The field of the invention is plastic components and, more particularly, the invention relates to automotive parts made of thermoset resin and reinforcing fiber mixtures laminated with in-mold paint sheets.

A modem automobile is manufactured from a large number of parts. Each of the parts that make up an automobile typically has a number of desired properties that are distinct to a particular part. In a particular automobile part, it may be more or less desirable for the part to be lighter or heavier, more rigid or flexible, or be in need of further finishing or not. Light weight, high strength, and good appearance (for example, as defined in the automotive industry, a "class A" surface) are generally desirable characteristics in auto parts because such properties tend to make automobiles more energy efficient, safer, and more attractive to consumers. Further, the issue of expense is always of great import. One example of the tradeoffs inherent in choosing how to make a part is the early auto industry's use of metal parts, such as steel parts, which were predominant through the 1970s. Although metal parts are strong and readily paintable to yield class A surfaces, they are also heavy and expensive to protect from corrosion and painting operations.

Various thermoset polymers (as opposed to thermoplastics) can be used to produce parts including parts for the manufacture of automobiles. One thermoset manufacturing technique uses sheet molding compound (SMC) (specific gravity of about 1.9 g/cc) which are generally lighter in weight than metal parts (specific gravity of about 7.8 g/cc). However, for the manufacture of certain parts, thermoset plastic parts, such as those made from SMC, cannot readily have necessary structures efficiently molded into them and further, even if formed cannot be inexpensively provided with Class A finishes. For example, in order to achieve a class A finish, a part made from sheet molding compound must be sanded, have a primer coat applied and dried, and then a base coat applied and dried, and a clear coat applied and dried. Further, each painting step may either require paints low in volatile organic compounds (which are expensive) or present significant costs and regulatory burdens because of the environmental impact of the painting operations. Last, SMC is always a two-piece assembly, not a one-piece assembly.

While some of the structural limitations of SMC parts can be addressed by gluing metal supports onto or between SMC components, SMC parts are not particularly amenable to a "one shot" solution in which a part having significant structural reinforcement and good appearance can be produced in one cycle of the compression mold. For example, rather than mold a steel support into an SMC part, a steel reinforcing sheet may be sandwiched between two sheets of SMC compound. However, achieving the result in that way generally uses two molding steps and one gluing step. Further, SMC does not expand in a compression mold, and is therefore subject to forming sinks. Such sinks should be repaired, if possible, before using the part. Because SMC is a thermoset plastic, and therefore cannot be meaningfully recycled, flaws that cannot be repaired are expensive and are environmentally unfriendly.

Some exterior auto and truck parts such as fenders, quarter panels, doors, trim parts bumpers, fender extensions and other molded exterior parts of are currently made of moldable thermoplastic polymers to obtain resistance to permanent deformation on impact and corrosion resistance. Typical moldable thermoplastic polymers that are being used for these parts are polypropylene, styrenics, and various heteroatom polymers. While such polymers can be molded into auto and truck parts that are substantially lighter than currently used sheet metal parts, but have limitations. In particular, such parts ordinarily do not pass through industry-standard painting operations with acceptable strength and durability. Further, such molded plastic parts have molded-in stress that releases when the part is exposed to heat, such as in a painting operation, thereby altering the dimensions or shape of the part. The release of the molded-in stress leads to unacceptable fit and finish of parts to other parts, and can lead to unacceptable deviations in the alignment of connected parts. Also, the reinforced resins that must be used to attempt to overcome the limitations of thermoplastic parts are quite expensive.

It would be advantageous to provide strong, finished parts that can be easily formed in one shot. It would be advantageous if such parts could be formed complete with reinforcing members, such as steel members, without adversely affecting the appearance of the part. It would be also advantageous if such results could be achieved by molding reinforcing members into the part without unduly lengthening cycling times for the manufacture of parts. Therefore, there is a need for parts that exhibit low weight, high strength and good appearance, and can be efficiently and cost-effectively manufactured.

A number of patents relate to various aspects of motor vehicle component technology. For example, U.S. Pat. No. 5,858,146 to Söchtig et al. discloses a process and device for manufacturing plastic parts with reinforcement fibers. The patent discloses that long reinforcing fibers can be incorporated in a flowable synthetic resin in a single working step and by a single apparatus and then introduced into a plastic mold, whereby per operating steps the lengths of the fibers and the density with which the fibers are incorporated can be varied in an optional manner. As will be recognized by those of ordinary skill, the apparatus disclosed in the '146 patent would present a fire and or explosion hazard if operated with ignitable fibers, such as carbon fiber. In addition, as will be recognized by those of ordinary skill in the art, the '146 patent discloses cutting machinery suitable only for fragile, brittle fibers such as fiber glass. The '146 patent is incorporated by reference into this application as if fully set forth herein.

BRIEF SUMMARY OF THE INVENTION

The present invention relates to a composite part that comprises: a cured resin and fiber composite integrally bonded to a paint sheet. The invention also relates to a method of manufacturing such a part.

A method of manufacturing a cured resin and fiber part generally includes providing a mold that defines a cavity having at least one shape-defining surface. An in-mold paint sheet having a bonding side and a finish side can be installed in the cavity of the mold such that the finish side of the in-mold paint sheet is positioned adjacent to the shape-defining surface of the mold. A mixture of a thermoset resin and a plurality of reinforcing fibers are then introduced into the cavity of the mold such that the resin and fiber mixture contacts the bonding side of the in-mold paint sheet. The in-mold paint sheet and resin and fiber mixture are then enclosed in the mold while being heated causing the resin and fiber mixture to be cured and bonded to the in-mold paint sheet, the in-mold paint sheet being cooled as part of the process, the total process resulting in a part having the finish side of the in-mold paint sheet as a finished surface of the part.

One aspect of the method of the present invention is embodied where the part is formed in a one-shot process.

Another aspect of the present invention concerns the use of a mold having a useful mold shear edge. The mold shear edge has an upper surface, and a lower surface spaced from the upper surface. The upper and lower surface define an interior portion between the lower surface and the upper surface where the part is to be formed, and an exterior portion between the lower and upper surface configured to remain free of the paint sheet and the resin and fiber mixture during molding. The interior portion is configured to contain the paint sheet and the mixture of resin and fiber while the exterior portion of the mold shear edge is configured to operate with an unfilled spacing between the upper surface and the lower surface to allow evolved gasses to escape.

In a further aspect of the invention the thermoset resin is a polyurethane resin.

In another aspect of the invention, the paint sheet is at least about one and a half millimeters (mm) thick.

In a still further aspect of the invention, the paint sheet is maintained at a temperature of about 70° F. to about 150° F.

In another aspect of the invention, a reinforcing member is introduced into the mold and the reinforcing member is incorporated into the part to provide a one piece assembly by the curing of the resin.

In a further aspect of the invention, installing the paint sheet comprises pre-forming the paint sheet using a billow forming/male forming thermoforming process.

In yet another aspect of the invention, the reinforcing fibers are carbon fibers. The carbon fibers can be about 10–50 millimeters in length, but are preferably about 20–30 millimeters in length, and most preferably about 25 millimeters in length.

In a still further aspect of the present invention, the thermoset resin substantially completely wets substantially all of the reinforcing fibers.

Still further benefits and advantages of the invention will be apparent to the skilled worker from the discussion that follows.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated. Percentages given below are intended to be read as "by weight" unless otherwise noted.

It is to be further understood that the title of this section of the specification, namely, "Detailed Description of the Invention" relates to a requirement of the United States Patent and Trademark Office, and is not intended to, does not imply, nor should be inferred to the subject matter disclosed herein or the scope of the invention.

Figure 1:
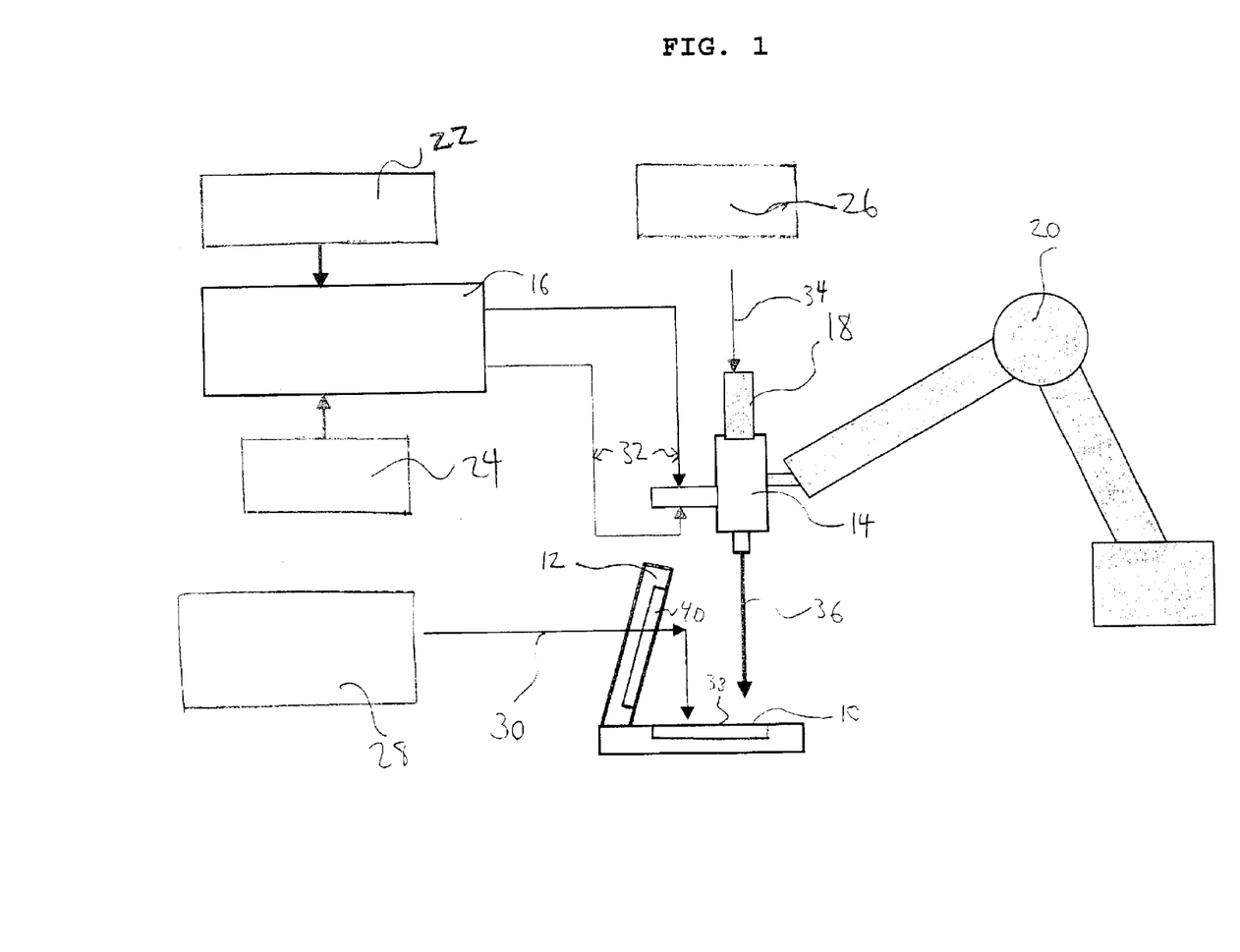
FIG. 1 is a process schematic of one possible embodiment of apparatus for practicing the present invention.

Referring to the Figures, and in particular to the schematic of FIG. 1, apparatus for forming a sheet, fiber and resin part in a process can comprise a mold 10, a press 12, a mixhead 14, and optionally, metering pumps 16, a chopper 18 and a robot 20. Ingredients that can be used by the apparatus can include first 22 and second 24 ingredients for a thermosettable resin 25 (such as using polyol and isocyanate to form polyurethane), fiber roving 26, and an in-mold paint sheet 28 (or simply "paint sheet"). Generally, the process involves positioning 30 the paint sheet 28 in the cavity 38 of the mold 10, forming the paint sheet to fit the mold, pumping 32 thermoset resin and feeding 34 fiber roving 26 to the mixhead 14 to form a resin-fiber mixture 36 (or mix), spraying the resin-fiber mixture 36 into the mold 10, and compressing and heating the contents of the mold 10 with the press 12. The heat and pressure bonds the in-mold paint sheet 28 to the resin-fiber mixture 36. Optionally, the heat can cause reactions that expand the thermosettable resin 25 to fill the mold 10 to help define the contours of the final part thereby avoiding defects such as sinks, which can be important for portions of a part having non-standard wall thicknesses such as the bosses that will be illustrated later. The final part presents the in-mold paint sheet 28 as the finished surface for at least one surface of the part.

A mold for use with the present invention can be a compression mold, a type of mold that is well known to those of ordinary skill in the art. Compression molds for use with the present invention will generally be made of aluminum, but can be made from other materials as is understood by those of ordinary skill in the art. The mold 10 will generally comprise two parts, such as a cavity 38 and a core 40 that can be brought together to trap the contents of the mold 10 for forming the part. When the cavity 38 and core 40 are brought together, pressure is applied to the contents of the mold 10. Each of the cavity and the core should be capable of being separately heated and/or cooled in order for one of the cavity and core to be heated while the other of the cavity and the core is cooled, thereby creating a temperature differential across the mold. Compression molds suitable for practice of the present invention can be obtained from any competent supplier of compression molds, many of which should be known to practicioners of ordinary skill.

Figure 2:
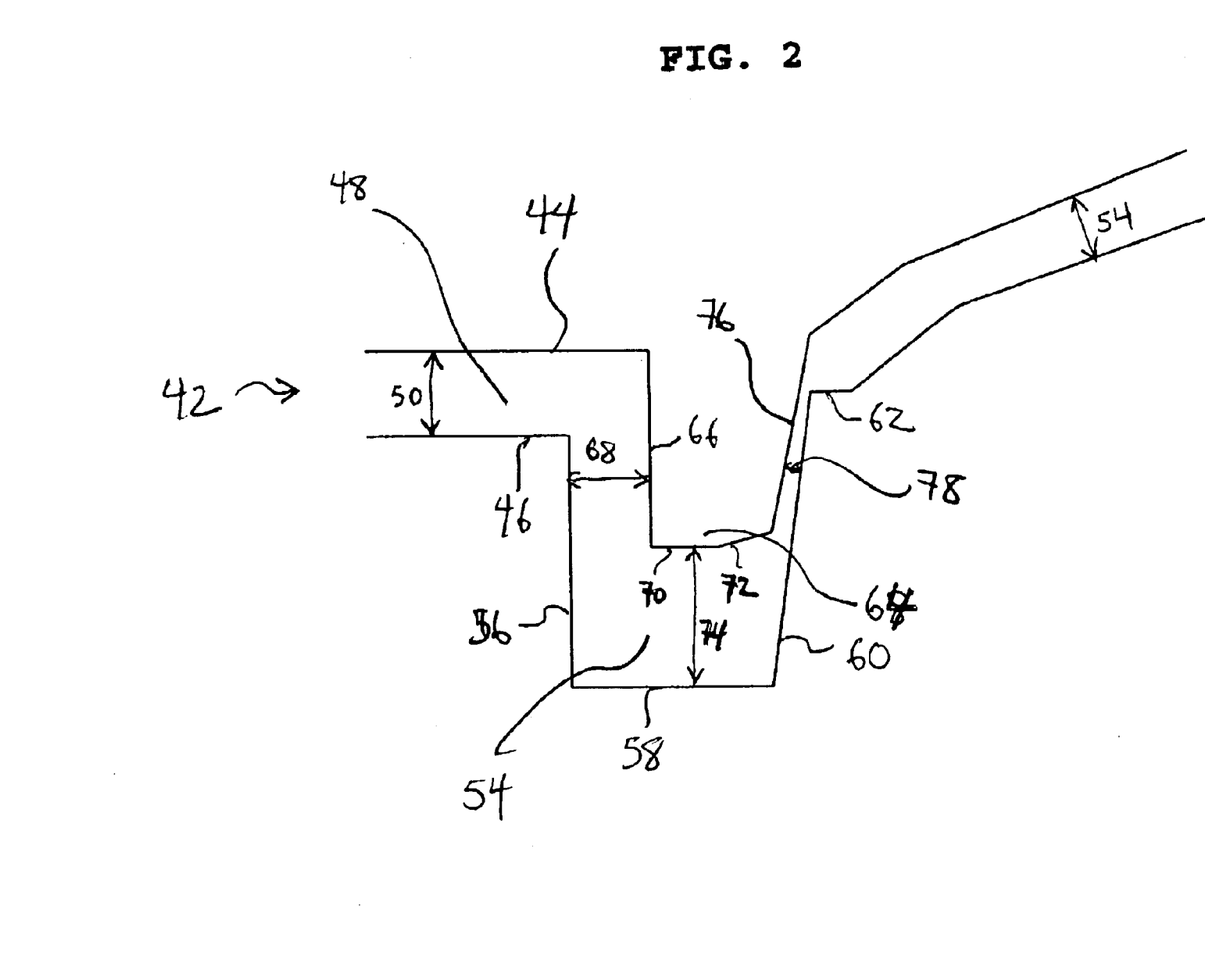
FIG. 2 is a schematic for a mold shear edge for molds that can be used to practice the present invention.

Optionally, the mold 10 can be provided with a shear edge 42 as illustrated in FIG. 2. The shear edge 42 comprises an upper surface 44 spaced from a lower surface 46. An interior portion 48 of the shear edge 42 is configured to contain a sheet of paint sheet 28 and the mixture 36 of resin and reinforcing fiber, and defines a first spacing 50 between the upper surface 44 and the lower surface 46. An exterior portion 52 of the mold shear edge 42 is configured to operate with a second spacing 54 (or path) between the upper surface 44 and the lower surface 46 to allow evolved gasses to escape. The second spacing 54 can be smaller than the first spacing 50.

The lower surface 46 defines a well 54. The well 54 can have an interior wall 56 that is generally perpendicular to the interior portion 48 of the mold shear edge 42. The well 54 can also have a floor 58 that is spaced from and generally parallel to the interior portion 48, and thereby generally transverse, or even perpendicular to, the interior wall 56, which it can be adjacent to. The well 54 can also have an exterior wall 60. The exterior wall 60 is transverse to the floor 58, and can slope away from the interior wall 56. The exterior wall 60 can be topped by a ledge 62 that extends away from the well 54 at a level generally opposite to that of the interior portion 48.

The upper surface 44 can define a rim portion 64 that is configured to extend down into the well 54. The rim portion 64 can be sized to not touch the well 54 when the mold 10 is in a closed position, as illustrated. The rim portion 64 can have an interior rim portion 66 that is generally parallel to and spaced from the interior wall 56 of the well 54. The spacing 68 between the interior rim portion 66 and the interior wall 56 of the well 54 can be about the same as the first spacing 50 between the upper 44 and lower 46 surfaces. The rim portion 64 can have a bottom portion 68 that has one or more bottom rim surfaces 70, 72 spaced from and generally parallel to the floor 58 of the well 54, preferably by a gap 74 that is greater in size than the first spacing 50. The gap 74 between the bottom of the well 54 and the bottom 68 of the rim portion 64 can hold resin that overflows from the mold 10 while allowing gasses to pass over the contained resin. The rim portion 64 also has an exterior rim portion 76 that is spaced from the exterior wall 60 of the well 54 and the ledge 62 by a passage 78 that can be substantially narrower than the first spacing 50. The passage 78 is protected by the rim portion 64 and narrow so as to allow gasses to leave the mold, but impede the follow of liquids, such as hot resins or resin ingredients, from leaving the mold. The illustrated mold shear edge 42 is useful when incorporated into a compression mold for forming large panels with thick class A sheets that otherwise might be marred by sinks or bubbles formed by trapped air. One benefit of such a shear edge 42 is that sheets of differing thicknesses can be readily accommodated.

Referring again to FIG. 1, a press 12 for use with the present invention is configured to hold the mold 10. As is well known to those of ordinary skill in the art, the press 12 will be configured to hold the cavity 38 and core 40 portions of the mold 10 apart while the mold is filled, and press the cavity and core portions of the mold together and provide heat to cure the thermoset resin 25 to form the part. The pressure and heat can be provided by a variety of means known to those of ordinary skill, and will not be detailed here. The mold can also space the cavity 38 and core 40 portions of the mold 10 from each other in order to allow the filling of the mold and allow the removal of a formed part. Presses suitable for practice of the present invention can be obtained from many suppliers including Krauss-Maffei and Cannon USA.

The mixhead 14 accepts reinforcing fiber 80 and the ingredients 22, 24 for the thermoset resin 25 and dispenses the resin-fiber mix 36. Complete systems having the chopper 18, mixhead 14, fiber roving 26 feed, and metering pump 16 equipment integrated can be purchased commercially from Krauss-Maffei of Munich, Germany (LFI-PUR) or Cannon USA of Cranberry Township, Pa. (Cannon Interwet). While Krauss-Maffei and Cannon USA sell mixheads for dispensing a mixture of glass fiber and polyurethane such commercially available apparatus are not presently sold ready for use with carbon fiber. In order to facilitate the use of carbon fiber, the apparatus used for chopping, treating, and spraying the fiber, all apparatus in the vicinity of the manufacture of the parts, including the chopper and mixhead, should be provided with category I wiring. The category I wiring can help protect the electrical components in order to assist in preventing carbon fibers or carbon dust from the cutting of the carbon fibers from shorting the electrical system of the apparatus.

Further, the systems from Krauss-Maffei and Cannon USA are not designed to form parts having class A finishes. Accordingly, changes in methods and modifications to such apparatus, as mentioned herein, are required to form parts from carbon fiber or to form parts having class A finishes in a one-shot process.

Apparatus for practicing the present invention will have metering pumps 16 that can be used to provide the mixhead 14 with ingredients 22, 24 for a thermosettable resin 25 such as a polyurethane resin. For example, the metering pumps 16 can provide an isocyanate and a polyol to the mixhead as the first 22 and second 24 ingredients. Fiber roving 26 such as fiber glass or carbon fiber roving can be provided via feed hoses to a chopper 18. The chopper 18 can be integral with the mixhead 14 or can be separate from the mixhead.

Figure 3:
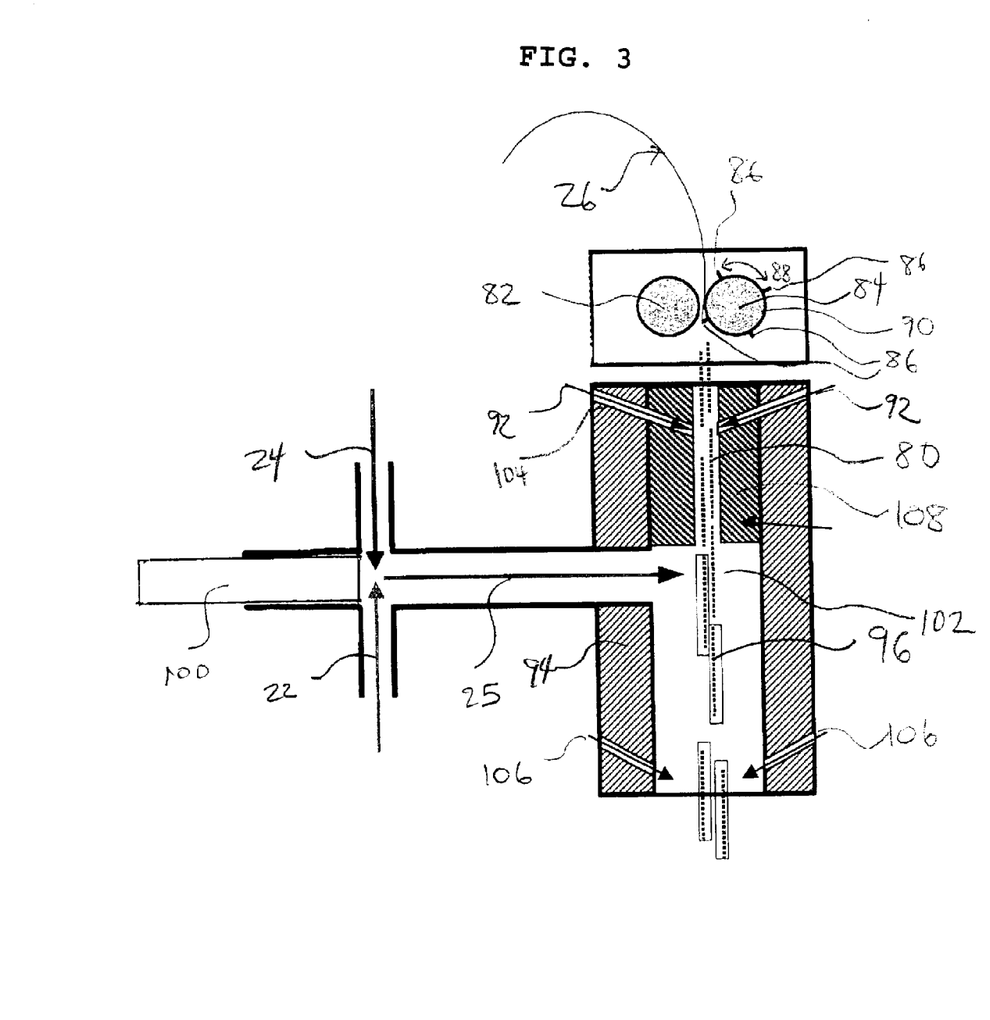
FIG. 3 is a simplified schematic of one possible embodiment of a chopper and mixhead for use in practicing the present invention.

FIG. 3 shows a schematic of a mixhead 14 of an apparatus that accepts reinforcing fibers 80 from a chopper 18 and chemically reactive plastic ingredients 22, 24, like a polyol and an isocyanate that are combined into a mixture of flowable synthetic resin 25 such as polyurethane.

The chopper 18 can have a pair of wheels 82, 84 that can cooperate to grip fiber roving 26 (fibers of substantially longer length than final fiber) and rotationally engaged the fiber to cut it. Glass fiber roving can be of several types including "A" glass, "E" glass, "S" glass, and "R" glass. Carbon fiber roving suitable for use with the present invention can include model XP33-4815R-X1 carbon fibers from Zoltek of St. Louis, Mo. Further, Natural fibers or aramid fibers can also be used.

At least one blade wheel 84 can have a plurality of blades 86 that sever the fiber roving 26 into shorter reinforcing fibers 80 in cooperation with an anvil wheel (or pinch wheel) 82. The blade wheel 84 and the anvil wheel 82 cooperate to sever the fiber roving 26 with the anvil wheel 82 providing a backing against which the blade wheel 84 presses to sever the fiber roving 26. The length of the reinforcing fibers 80 formed by the chopper 18 can be defined by the spacing 88 of the blades 86 around the blade wheel 84 and the size of blade wheel. In the illustration, the blade wheels 84 is provided with cutting blades 86 in the form of four blades distributed about the wheel periphery 90 and with which the fiber roving 26 is subdivided into sections of predetermined length, reinforcing fibers 80. The blades 86 can be regularly positioned around the blade wheel 84 to provide reinforcing fibers 80 of generally uniform length, or alternately, the blades 86 can be positioned irregularly to provide a mix of reinforcing fibers 80 of different lengths. As is known to those of ordinary skill in the art, the number of blades 86 needed to achieve a particular length of reinforcing fiber 80 is related to the size of the blade wheel 84. A large blade wheel 84 will need more blades to produce reinforcing fibers 80 of the same length as a smaller wheel.

Further, a single blade wheel 84 can be configured to cut different fibers to different lengths. For example, the one end of the blade wheel 84 can have eight blade sections, while the middle section has four blade sections, and the far end only two blade sections. The blade wheel 84 can then be indexed manually or automatically to change the length of the reinforcing fibers 80 cut. Such operation can permit the reinforcing fibers 80 formed to be varied during the pouring of different parts, or even different portions of one part.

The composition of the wheels 82, 84 can be a function of the type of fiber roving 26 to be chopped. One factor that should be considered in selecting wheels 82, 84 is that the wheels 82, 84 should not break the fibers at lengths other than the desired lengths, and the wheels 82, 84 should not create "fuzzing" or other undesirable characteristics in the pinched fiber roving 26. For carbon fiber wheels 82, 84 made from urethane rubber and having a durometer hardness of 80 can work well. For glass fiber, wheels 82, 84 having a durometer hardness of about 40–60 can work well.

In the case of glass fiber roving, the blades 86 can be configured to bend and break the glass roving 26 into generally fixed lengths of fiber glass. Alternatively, in the case of carbon fibers, the blades 86 can be configured to shear the fiber roving 26 rather than bend the carbon to break them. Blades 86 that shear fiber can be used, for example, with carbon fiber roving to produce fixed-length carbon fibers. When cutting carbon fibers, using diamond-coated or carbide-coated blades 86 can provide more efficient cutting by the blades and a longer wear life for the blades.

Preferably the fiber roving 26 is chopped into reinforcing fiber 80 with lengths of from 20 to 50 mm, most preferably a length of about 25 mm. Through the use of multiple mixheads 14, multiple choppers 18, substitution of the cutting members 86 or other means, different lengths can be used even during the course of one fill of the mold 10. A reinforcing fiber 80 which has previously been subdivided into length sections by the blades 86 can be impelled (or shot) into the mixhead 14. Venturi air 92 can be introduced to assist the wheels 82, 84 in impelling the reinforcing fibers 80 toward the immersion tube 94, where the reinforcing fibers 80 will be wetted or coated with thermosettable resin 25 to form wetted or coated fibers 96.

At the same time as reinforcing fibers 80 are impelled or shot into the immersion tube 94, a resin 25 or the ingredients for a resin system 22, 24 can be introduced into the mixhead 14. A synthetic resin system, such as a polyurethane resin system can be used. Suitable resin systems will exhibit good flow in the mixhead 14 and mixhead feed systems 16, good coating characteristics for the reinforcing fiber 80 being used, and form a strong bond with the bonding side 98 of the paint sheet 28. Suitable resins or resin systems can be either low density systems or high density systems.

Suitable polyurethane resin systems include low and high density polyurethane systems from Huntsman of Auburn Hills, Miss. (and other locations), and the Elastoflex E 3509 low density polyurethane system from BASF of Mount Olive, N.J. As will be recognized by those of ordinary skill in the art, the rate of cure, materials properties, and part weight and density and other parameters will be influenced by the resin system selected.

Continuing with FIG. 2, the operation of the mixhead 14 involves combining the ingredients 22, 24 by impelling (or shooting) the synthetic resin toward the immersion tube with a shot piston 100. The immersion tube 94 suitable for accepting the impelled thermosettable resin 25 and introducing the resin to reinforcing fibers 80, especially strands of glass fibers or carbon fibers of about 20 mm–50 mm in length. The immersion tube 94 is where the reinforcing fibers 80 are immersed in or coated with the impelled flowable synthetic resin 25 prior to being sprayed out of the immersion tube 94 to fill the mold 10.

The reinforcing fibers 80 or the other fillers pass through a reaction zone 102 where they are wet with synthetic resin and then distributed in the mold cavity. The movement of the coated fibers 96 or the other filler through the immersion tube 94 can be aided by a fluidizing agent, like, for example, a pressurized gas 92 (e.g. Venturi air) which is fed through openings 104.

A fluidizing agent can also be provided as a distribution gas flow 106 to impel or shoot synthetic resin coated reinforcing fibers 96 into the mold. The mixing head 14 can also have a clean-out piston 108 capable of traversing the length of the immersion tube 94 to remove resin and fiber adhering to the tube which may block the flow of fibers and/or synthetic resin. The clean-out piston 108 can clean the immersion cylinder 14 by traversing the cylinder to expel unwanted material.

Figure 4:
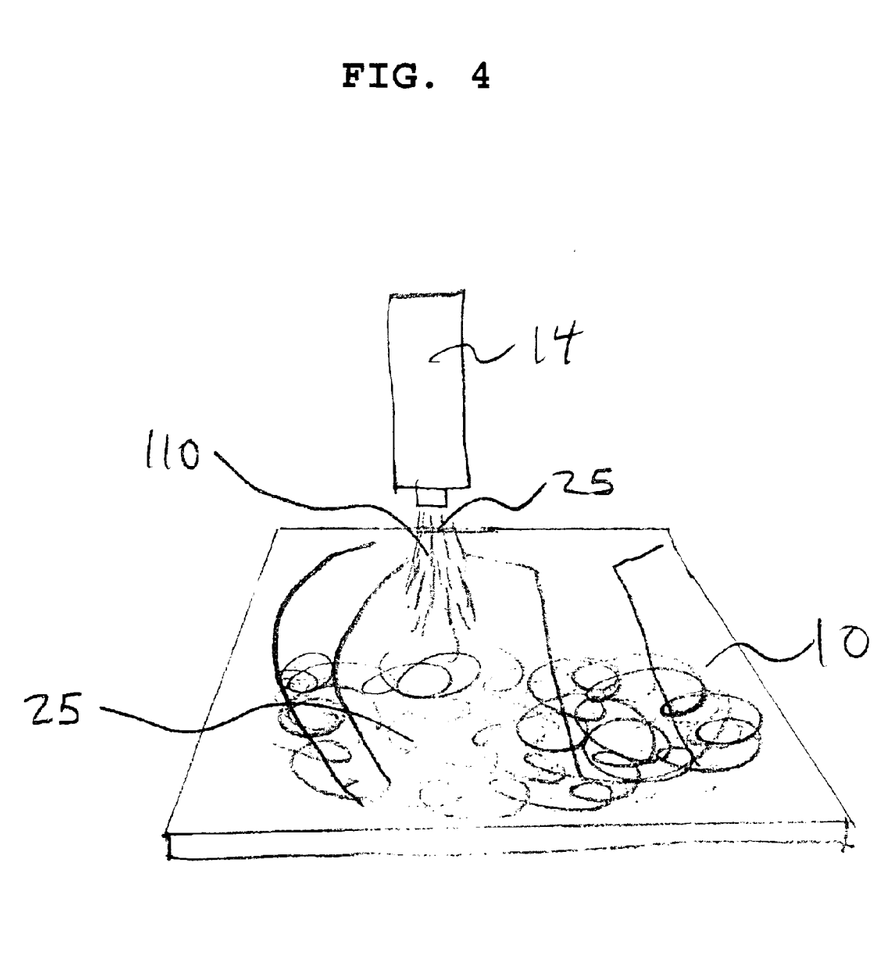
FIG. 4 is a diagram of a mixhead being used to fill a mold in accordance with the present invention.

A representative spray pattern 110 of reinforcing fiber wetted with synthetic resin 96 is shown in FIG. 4. The immersion tube 94 directs a cone of wetted fiber away from the mixhead and towards the mold 10. As indicated in FIG. 1, a robot 20 can direct the spray of the mixhead 14 to select the fill rate for different portions of the mold 10 and/or vary the fiber length during portions of a fill. Different flow rates of the mixture of reinforcing fiber and resin 36 and/or proportions (or percentages) of reinforcing fiber and resin can be selected by controlling the flow rate of resin into the mixhead 14, and the rate at which the chopper 18 provides the reinforcing fiber 80.

Composite parts having carbon fiber can be made having about 10% to 50% carbon fiber content by weight relative to the combined weight of resin and fiber, excluding the weight of the paint sheet 28. As will be understood by those of ordinary skill, the paint sheet 28 will generally be more than 1 millimeter thick and will contribute some to the impact resistance, strength and weight of the part. Preferably, parts having carbon fiber will have about 20%–30% by weight carbon fiber and about 70–80% by weight resin. Composite parts having glass fiber can be made having about 10% to 80% glass fiber content by weight relative to the combined weight of resin and fiber, excluding the weight of the paint sheet. Preferably, parts having glass fiber will have about 30%–50% glass fiber and about 50–70% resin. Further, parts can be made having more than one kind of fiber, where the desirable percentages of each fiber. Thus, an even mix of carbon and glass fiber can be made having can preferably have about 10–15% carbon fiber, 15–25% glass fiber, and about 40–60% resin.

In manufacturing parts in accordance with the present invention, a paint sheet 28 is introduced to the mold 10. The introduction of the paint sheet 28 can be done manually or can be automated. A paint sheet 28 for use with the present invention will have a bonding side and a finish side. The bonding side of the paint sheet 28 can be a thermoplastic layer that can be melted when the mold 10 is heated. The melted thermoplastic layer can then bond with the resin system sprayed into the mold 10. The finish side will have a surface that can be presented as the surface of the final product, and the operation will have been done with a minimal environmental impact. The finish side will present a high quality painted surface, optionally coated with a masking sheet. The masking sheet can be thermoformable to facilitate shaping the paint sheet 28 to the mold 10 prior to filling the mold with the resin coated reinforcing fiber 25.

The paint sheet 28 can be cut, trimmed, or sized prior to being placed in the mold 10, or a section of paint sheet can be placed in the mold prior to or at the same time as being cut, sized, or trimmed. Optionally, the paint sheet 28 can be treated prior to filling the mold, including, but not limited to: pre-drying the sheet before placing the paint sheet in the mold in order to prevent absorbed water from causing defects in the final product. A further option is for the paint sheet 28 to be thermoformed to conform to the contours of the mold 10 prior to the introduction of the mixture of resin and reinforcing fiber 25.

One method of introducing the paint sheet 28 uses a billow form/male form thermoforming method, which is known to those of ordinary skill in the art. Advantages of the billow form/male form thermoforming method include: no human contact with the finish side of the sheet, no introduction of stray fibers or other defect-causing materials to the finish side of the sheet, and an easily achieved high level of automation. The billow form/male form thermoforming method can also cover the entire cavity of the mold with the plastic sheet, which can ease or obviate the need for cleaning of the cavity side of the mold when the part is removed.

During the curing of the part, the mold portions (whether cavity 38 or core 40) adjacent to the paint sheet can be cooled. Preferably, the mold is cooled to a temperature of about 70° F. to about 150° F. It is thought that keeping the paint sheet 28 at a temperature of from about 70° F. to about 150° F. helps the system resist deformities from appearing during the cure by accommodating the different coefficients of linear thermal expansion of different materials. Should the materials have a the same (or very close) coefficients of thermal expansion less of a temperature gradients or no temperature gradient between the mold and the cavity may be needed to obtain high quality results. Cooling can be especially important when the part is heated during curing to accelerate the cure of the part, such as is common to decrease cycle times during mass production.

Paint sheets 28 that are suitable for the practice of the present invention include sheets from Avery Dennison Performance Films Division of Schererville, Ind. such as the AVLOY product line (e.g. AL10052G3, state blue sheet) and sheets sold under the REX AM, SENOPLAST, and ROYALITE, and SPARTECH brands. In-mold paint sheets 28 for use in the present invention can be three to five ply laminate sheets. It can be desirable to use sheets 28 having a thickness of greater than a millimeter and a half in order to avoid read-through fibers from the fiber-resin mix "reading through" the paint sheet. Paint sheets that are thicker than a millimeter and a half 28 also will generally have a more uniform drape in the mold, and withstand rougher handling, resulting in fewer defects during mass production than thinner sheets.

Figure 5A:
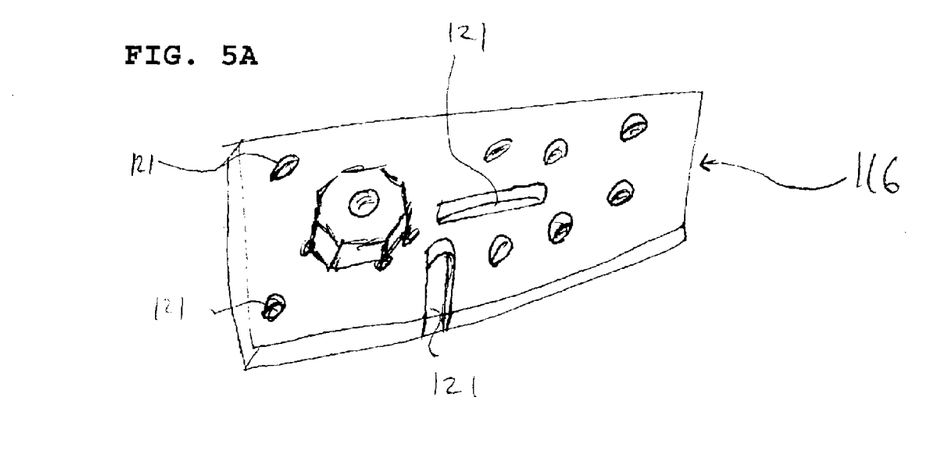
FIG. 5A is a diagram of an exemplary reinforcing plate.
Figure 5B:
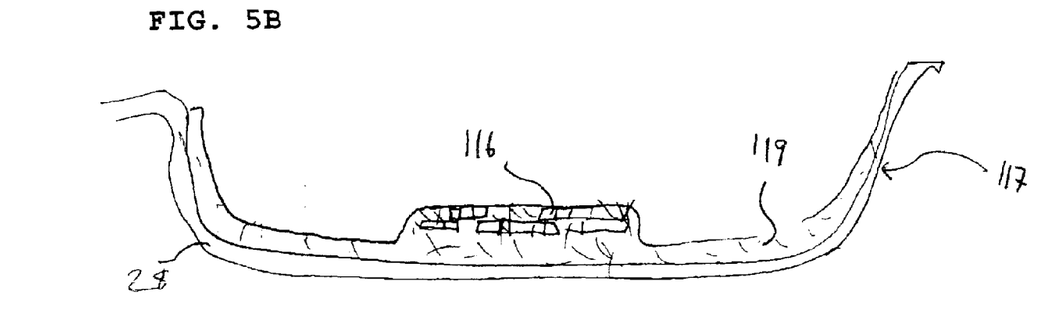
FIG. 5B is a cross-sectional diagram of the exemplary reinforcing plate of FIG. 5A incorporated in a part of the present invention.

Often added strength is needed in a plastic part in order to meet load requirements for an application. Referring to FIGS. 5A & 5B, a reinforcing member 116, including, but not limited to the illustrated plate, can be positioned in the mold to provide added strength to the formed part 117. The reinforcing member can be provided with perforations or holes 121 to allow the resin and fiber mixture to flow around and/or through the part and appropriately secure the reinforcing member to the part. O-rings can be used to secure the reinforcing member to the mold so as to properly position the part during curing. The result is a reinforcing member 116 integrally encased in and/or bonded to the cured resin and fiber mix 119. Generally, such members will be positioned in the mold 10 after the paint sheet 28, but some reinforcing members may be advantageously placed in the mold prior to the paint sheet. Reinforcing members can be made of any material that is compatible with the resin system and the mold. Materials can include, but are not limited to, steel, aluminum, or magnesium.

EXAMPLE 1

Comparison of the Use of Carbon Fiber and Glass Fiber

Eight parts were made in accordance with the methods outlined above. Three composite automobile hoods were made from carbon fiber from Zoltec wetted with a polyurethane resin system from Huntsman in Krauss-Maffei LFI-PUR system, modified as above for use with carbon fibers. Five composite automotive hoods were made with glass fiber from OC using the same Huntsman resin system in a Krauss-Maffei LFI-PUR system having category I wiring, but having the normal pinch wheels and cutters for a glass system. Similar results to those detailed below can be obtained using resin systems from other providers such as BASF.

Segments were cut from the hoods and subjected to a battery of standard tests. Samples were sized according to the test to be performed, with most tests being performed on pieces having a size of 1" wide by 2" long, and about ⅛" thick. The composition of the parts, the test methods specified and the results of the tests follow in Table 1. Tests were performed along one direction called "parallel" or "para." In order test whether orientational variation of the tested properties was present, measurements were made on the parts at a direction rotated 90° from the first test and called "perpendicular" or "perp" tests.

TABLE 1

| Characteristic [Test Specification] | | #1 | #2 | #3 | #4 | #5 | #6 | #7 | #8 |
|---|---|---|---|---|---|---|---|---|---|
| Type of Fiber | | Carbon | Carbon | Carbon | Glass | Glass | Glass | Glass | Glass |
| % (wt/wt) [ASTM D-2584] | | 20 | 25 | 30 | 30 | 40 | 50 | 30 | 30 |
| Length of Fiber (mm) | | 25 | 25 | 25 | 25 | 25 | 25 | 25/50/25 | 50 |
| SPG(g/cc) | para | 1.11 | 1.17 | 1.23 | 1.23 | 1.52 | 1.68 | 1.36 | 1.30 |
| [ASTM D-792-91 Method A] | perp | 1.07 | 1.13 | 1.23 | 1.20 | 1.41 | 1.59 | 1.32 | 1.30 |
| | random | 1.16 | 1.20 | 1.24 | 1.16 | 1.45 | 1.57 | 1.37 | 1.31 |
| Flexural modulus @break | para | 1384 | 1651 | 1473 | 802 | 1480 | 1804 | 1134 | 947 |
| (ksi) | perp | 921 | 1215 | 1440 | 888 | 1060 | 1755 | 890 | 893 |
| [ASTM D-790-95 Method A] | | | | | | | | | |
| Flexural Strength (ksi) | para | 28.7 | 32.8 | 29.0 | 24.4 | 46.9 | 52.3 | 38.7 | 31.0 |

TABLE 1-continued

| Characteristic [Test Specification] | | #1 | #2 | #3 | #4 | #5 | #6 | #7 | #8 |
|---|---|---|---|---|---|---|---|---|---|
| [ASTM D-790-95 Method A] | perp | 19.4 | 23.9 | 28.4 | 25.5 | 33.4 | 41.4 | 29.5 | 26.6 |
| Tensile Strength (ksi) | para | 11.0 | 8.7 | 9.2 | 12.0 | 18.8 | 23.5 | 17.9 | 20.3 |
| [ASTM D638-96 Tensile] | perp | 12.1 | 10.1 | 15.0 | 14.1 | 17.6 | 31.1 | 15.4 | 13.2 |
| Tensile Modulus (ksi) | para | 1960 | 1015 | 1035 | 888 | 1136 | 2006 | 1039 | 1214 |
| [ASTM D638-96 Tensile] | perp | 1964 | 1668 | 1945 | 876 | 1037 | 1710 | 1049 | 930 |
| Elong. @ Break (%) | para | 0.6 | 0.9 | 0.9 | 1.7 | 2.1 | 1.6 | 2.1 | 2.1 |
| [ASTM D638-96 Tensile] | perp | 0.7 | 0.9 | 0.9 | 1.8 | 2.0 | 2.1 | 1.9 | 2.2 |
| Notched Izod (lbf/in) | para | 2.5 | 2.3 | 3.0 | 9.0 | 19.7 | 17.1 | 10.0 | 15.2 |
| [ASTM D-256] | perp | 2.8 | 3.8 | 4.1 | 13.2 | 14.8 | 18.7 | 12.6 | 10.9 |
| Thermal Expansion | para | 11.8 | 13.4 | 15.5 | 15.5 | 18.8 | — | — | — |
| [(mm/mm)/° C. × 10-6)] [ASTM D-256] | perp | 17.0 | 14.0 | 12.8 | 16.3 | 21.5 | — | — | — |

The most direct comparison is between part #3 and part #4. Part #3 is made of 30% carbon fiber, and part #4 is made from 30% glass fiber. Both parts have the same specific gravity, use the same resin system, and were made in the same mold. Part #3 has a markedly higher flexural modulus, flexural strength, and tensile modulus. Although carbon composite part #3 takes more tension to break than glass composite part #4, it elongates substantially less before reaching the breaking point, maintaining a more consistent size than the glass fiber part even under higher stresses. Further, carbon fiber composite part #3 had lower total thermal expansion than the tested glass composite part #4. A comparison of the carbon fiber parts with the glass fiber parts shows that these characteristics will be true across wide variations in fiber content of composite parts.

EXAMPLE 2

Parts Having Thick Cross Sections

Figure 6A:
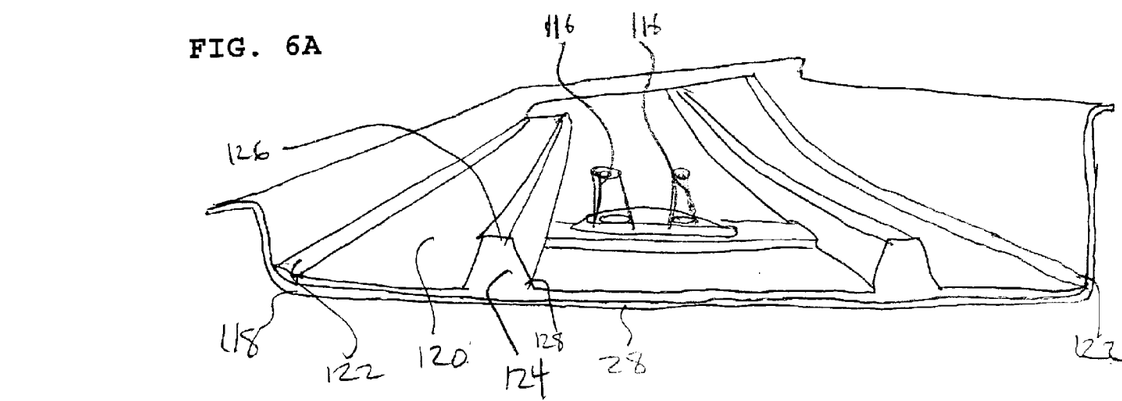
FIG. 6A is a end-on view of a part having a stiffening rib made in accordance with the present invention.

FIGS. 6A & B illustrate exemplary parts made according to the present invention. The present invention can provide strong parts with thick cross-sections. FIG. 6A illustrates a cross-section of an automobile panel 118. The panel is made from a carbon fiber/polyurethane composite 120 with a paint sheet 28 integrally bonded thereto. The panel has strengthening beads 122 located at the corners, and stiffening ribs 124 formed integrally to the part. The carbon fiber door panel 118 illustrated is about 8 feet long, about 2 feet wide, and about ¼" thick. The stiffening ribs 124 are trapezoidal in shape and are about 1" tall, 2" wide at the top 126, and 2½" wide at the bottom 128. The exemplary part has reinforcing members 116 molded in. The form illustrated in FIG. 6B is in the form of overmolded bosses.

Figure 6B:
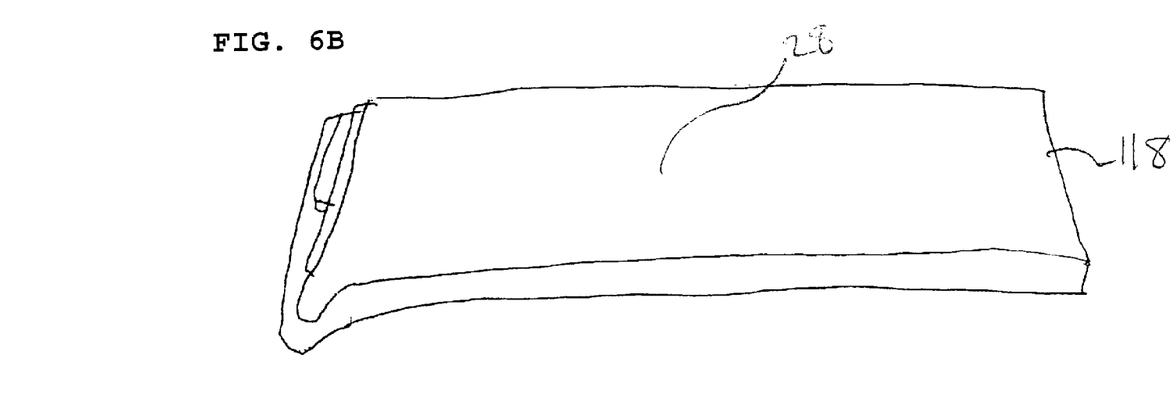
FIG. 6B is an illustrated view of the finished surface of a part made in accordance with the present invention.

Referring to FIG. 6B, the automobile panel 118 presents a class A finished surface that is the paint sheet 28. The part exhibits a glossy, surface free of blisters, bubbles, cracks, "orange peel" and other common deformities common to auto parts made from thermoset plastics. The panel 118 was made more quickly than would be possible with sheet molding compound.

EXAMPLE 3

Parts Having Textured and Smooth Class A Surfaces

A door panel was made according to the present invention. The door panel was made of a paint sheet integrally bonded with a polyurethane/carbon fiber composite. The region of the outside of the door panel was textured by texturing the mold prior to forming the part, yielding a class A partially textured surface.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

I claim:

1. A method of forming a finished composite part comprising:
providing a mold, the mold defining a cavity with a shape-defining surface;
providing an in-mold paint sheet having a thickness of greater than about one millimeter, the in-mold paint sheet having a bonding side and a finish side;
installing the in-mold paint sheet in the cavity of the mold such that the finish side of the in-mold paint sheet is positioned adjacent to the shape-defining surface of the mold; introducing a mixture of a resin and a plurality of reinforcing fibers into the cavity of the mold such that the resin and fiber mixture contacts the bonding side of the in-mold paint sheet; said resin and fiber mixture being formed by impelling uncoated reinforcing fiber towards the mold cavity and causing a resin to substantially completely wet substantially all of said uncoated reinforcing fibers prior to the introduction of the fiber and resin mixture into the mold cavity;
enclosing the in-mold paint sheet and resin and fiber mixture in the mold; and
cooling the in mold paint sheet while at least some of the resin is curing; wherein the resin and fiber mixture is cured and bonded to the in-mold paint sheet to form a part having the finish side of the in-mold paint sheet as a finished Class A surface of the part.

2. The method of claim 1, wherein the part is formed as a one-piece assembly of uneven thickness having a Class A surface, wherein at least one three dimensional reinforcing structure integral with the part such that the appearance of the Class A surface is undisturbed by the reinforcing structure.

3. The method of claim 1, wherein the mold has a shear edge comprising:
an upper surface;
a lower surface spaced from the upper surface, defining an interior portion between the lower surface and the upper surface where the part is to be formed, and an exterior portion between the lower and upper surface configured to remain free of the paint sheet and the resin and fiber mixture during molding, wherein an interior portion is configured to contain the paint sheet and the mixture of resin and fiber and an exterior portion of the mold shear edge is configured to operate with a spacing between the upper surface and the lower surface to allow evolved gasses to escape and allow the paint sheet to protrude from the mold.

4. The method of claim 1, wherein the resin is a thermoset polyurethane resin, and the thermoset polyurethane resin expands as it cures.

5. The method of claim 1, wherein the reinforcing fiber is a carbon fiber.

6. The method of claim 5, wherein the carbon fibers are about 10–50 millimeters in length.

7. The method of claim 5, wherein the carbon fibers are about 20–30 millimeters in length.

8. The method of claim 5, wherein the carbon fibers are about 25 millimeters in length.

9. The method of claim 1, wherein the paint sheet is maintained at a temperature of about 70° F. to 150° F.

10. The method of claim 1, wherein the paint sheet is at least one and a half millimeters thick.

11. The method of claim 1, wherein a reinforcing member is introduced into the mold and the reinforcing member is incorporated into the part to provide a one piece assembly of uneven thickness having a Class A surface, such that the appearance of the Class A surface is undisturbed by the reinforcing member, by the curing of the resin.

12. The method of claim 1, wherein installing the paint sheet comprises pre-forming the paint sheet using a billow form/male form thermoforming process.

13. A method of forming a finished composite part comprising:

providing a mold, the mold defining a cavity with a shape-defining surface, the mold having a shear edge, the shear edge having an upper surface, having a lower surface spaced from the upper surface, defining an interior portion between the lower surface and the upper surface where the part is to be formed, and having an exterior portion between the lower and upper surface configured to remain free of the paint sheet and the resin and fiber mixture during molding, wherein an interior portion is configured to contain the paint sheet and the mixture of resin and fiber and an exterior portion of the mold shear edge is configured to operate with a spacing between the upper surface and the lower surface to allow evolved gasses to escape;

providing an in-mold paint sheet having a thickness of greater than about one millimeter, the in-mold paint sheet having a bonding side and a finish side;

installing the in-mold paint sheet in the cavity of the mold by preforming the paint sheet to the mold so that that the finish side of the in-mold paint sheet is conformed adjacent to the shape-defining surface of the mold;

introducing a mixture of a polyurethane thermoset resin and a plurality of carbon reinforcing fibers with a length of about 25 millimeters by impelling uncoated carbon reinforcing fiber towards the mold cavity so that the resin substantially completely wets substantially all of the reinforcing fibers prior to the introduction of the fiber and resin mixture into the cavity and so that the resin and fiber mixture contacts the bonding side of the in-mold paint sheet;

enclosing the in-mold paint sheet and resin and fiber mixture in the mold;

heating the resin and fiber mixture wherein the resin expands in the mold as it cures; and cooling the paint sheet to a temperature of about 70° F. to 150° F., wherein the resin and fiber mixture is cured and bonded to the in-mold paint sheet in a one-shot process to form a one piece assembly having the finish side of the in-mold paint sheet as a finished Class A surface of the part.

* * * * *